US007870047B2

(12) United States Patent
Mojsilovic et al.

(10) Patent No.: US 7,870,047 B2
(45) Date of Patent: Jan. 11, 2011

(54) SYSTEM, METHOD FOR DEPLOYING COMPUTING INFRASTRUCTURE, AND METHOD FOR IDENTIFYING CUSTOMERS AT RISK OF REVENUE CHANGE

(75) Inventors: Aleksandra Mojsilovic, New York, NY (US); Bonnie Kathryn Ray, South Nyack, NY (US); Craig F. Schreiber, Bedford Hills, NY (US); Valerie C. Wiggins, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 10/942,805

(22) Filed: Sep. 17, 2004

(65) Prior Publication Data

US 2006/0064370 A1    Mar. 23, 2006

(51) Int. Cl.
*G06Q 40/00* (2006.01)
(52) U.S. Cl. .................. 705/35; 705/38; 705/36 R
(58) Field of Classification Search .............. 705/38, 705/36; 726/3
See application file for complete search history.

(56) References Cited

U.S. PATENT DOCUMENTS

| 5,765,138 | A  | * | 6/1998  | Aycock et al. ........... 705/7 |
| 6,330,546 | B1 | * | 12/2001 | Gopinathan et al. ....... 705/35 |
| 6,658,393 | B1 | * | 12/2003 | Basch et al. ............. 705/38 |
| 6,836,777 | B2 | * | 12/2004 | Holle ................... 707/101 |
| 6,839,682 | B1 | * | 1/2005  | Blume et al. ............ 705/10 |
| 6,871,181 | B2 | * | 3/2005  | Kansal .................. 705/4 |
| 7,191,150 | B1 | * | 3/2007  | Shao et al. ............. 705/38 |
| 7,251,624 | B1 | * | 7/2007  | Lee et al. .............. 705/35 |
| 7,305,351 | B1 | * | 12/2007 | Bechhofer et al. ........ 705/7 |
| 7,305,364 | B2 | * | 12/2007 | Nabe et al. ............. 705/37 |
| 7,409,365 | B1 | * | 8/2008  | Hood ................... 705/35 |
| 7,627,513 | B2 | * | 12/2009 | Kolos et al. ............ 705/36 R |
| 2003/0093347 | A1 | * | 5/2003  | Gray .................... 705/35 |
| 2003/0149657 | A1 | * | 8/2003  | Reynolds et al. ......... 705/38 |
| 2003/0212618 | A1 | * | 11/2003 | Keyes et al. ............ 705/35 |
| 2003/0212643 | A1 | * | 11/2003 | Steele et al. ........... 705/400 |
| 2003/0233325 | A1 | * | 12/2003 | Belyi ................... 705/42 |
| 2004/0039619 | A1 | * | 2/2004  | Zarb .................... 705/7 |
| 2004/0054563 | A1 | * | 3/2004  | Douglas ................. 705/7 |
| 2004/0078319 | A1 | * | 4/2004  | Madhavan et al. ......... 705/38 |
| 2005/0027645 | A1 | * | 2/2005  | Lui et al. .............. 705/38 |
| 2005/0125360 | A1 | * | 6/2005  | Tidwell et al. .......... 705/65 |
| 2005/0278245 | A1 | * | 12/2005 | Celati .................. 705/38 |
| 2007/0005479 | A1 | * | 1/2007  | Ikeda et al. ............ 705/35 |

(Continued)

OTHER PUBLICATIONS

Mary Sit-DuVall, Checking up on hospitals/Shopper offers professional's view of what the patient sees and hears, Oct. 10, 1999, Houston Chronicle, p. 1(HCACuSatis).*

(Continued)

*Primary Examiner*—James P Trammell
*Assistant Examiner*—Chika Ojiaku
(74) *Attorney, Agent, or Firm*—Stephen C. Kaufman, Esq.; McGinn IP Law Group, PLLC

(57) ABSTRACT

A system (and method, and method for deploying computing infrastructure) for identifying a customer at risk of revenue change (e.g., revenue loss or revenue gain) including computing a risk score based on a plurality of risk factors associated with the customer.

12 Claims, 10 Drawing Sheets

U.S. PATENT DOCUMENTS

| | | | | |
|---|---|---|---|---|
| 2007/0027698 A1* | 2/2007 | Daul et al. | ...................... | 705/1 |
| 2007/0250362 A1* | 10/2007 | Vacante et al. | .................. | 705/7 |
| 2007/0255649 A1* | 11/2007 | Vagim et al. | ................... | 705/38 |
| 2007/0276749 A1* | 11/2007 | Vagim et al. | ................... | 705/38 |
| 2008/0021750 A1* | 1/2008 | Masuyama et al. | .............. | 705/7 |
| 2008/0027841 A1* | 1/2008 | Eder | ........................... | 705/35 |
| 2008/0046368 A1* | 2/2008 | Tidwell et al. | ................ | 705/44 |
| 2008/0059333 A1* | 3/2008 | Ganesan et al. | ............... | 705/27 |
| 2008/0071676 A1* | 3/2008 | Vagim et al. | ................... | 705/38 |
| 2008/0189139 A1* | 8/2008 | Sachdeva et al. | ............... | 705/3 |
| 2008/0288226 A1* | 11/2008 | Gurpinar et al. | .............. | 703/10 |
| 2008/0313065 A1* | 12/2008 | Eder | ........................... | 705/35 |
| 2008/0313100 A1* | 12/2008 | Weber et al. | .............. | 705/36 R |
| 2009/0012840 A1* | 1/2009 | Gaubatz et al. | ............... | 705/10 |
| 2009/0043637 A1* | 2/2009 | Eder | ........................... | 705/10 |
| 2009/0043713 A1* | 2/2009 | Weber et al. | .............. | 705/36 R |
| 2009/0106133 A1* | 4/2009 | Redmayne | ................... | 705/35 |
| 2009/0138309 A1* | 5/2009 | Reynolds et al. | ............... | 705/7 |
| 2009/0192883 A1* | 7/2009 | Lepman | ....................... | 705/10 |
| 2009/0248375 A1* | 10/2009 | Billiotte et al. | ................. | 703/2 |
| 2009/0265190 A1* | 10/2009 | Ashley et al. | .................. | 705/4 |
| 2009/0276257 A1* | 11/2009 | Draper et al. | .................. | 705/7 |
| 2009/0276289 A1* | 11/2009 | Dickinson et al. | ............. | 705/10 |
| 2009/0313180 A1* | 12/2009 | Merkoulovitch et al. | .. | 705/36 R |

OTHER PUBLICATIONS

Earnings; Columbia Sets Restructuring Timetable, Plans Stock Buyback, Jul. 30, 1998, Los Angeles Times, p. 4 (Restructure).*
Columbia/HCA earnings fall short, Feb. 24, 1999, Journal Record, p. 1 (HCAEarn).*
Patricia Sellers, How to Handle Customers' Gripes, Oct. 24, 1988, Fortune (GoogleCServ).*
https://www.riskinstitute.org/peri/.../RMSBCommLegalCheck.pdf, Sources of Risk, Effects of Risk and Strategies to Deal with Risk, Chapter 4 (Risk Effects).*
Marisa Bertocchi, Rosella Giacometti, Stavros A. Zenios, Nov. 2, 2000, Risk factor analysis and portfolio immunization in the corporate bond market (Risk Factor).*

* cited by examiner

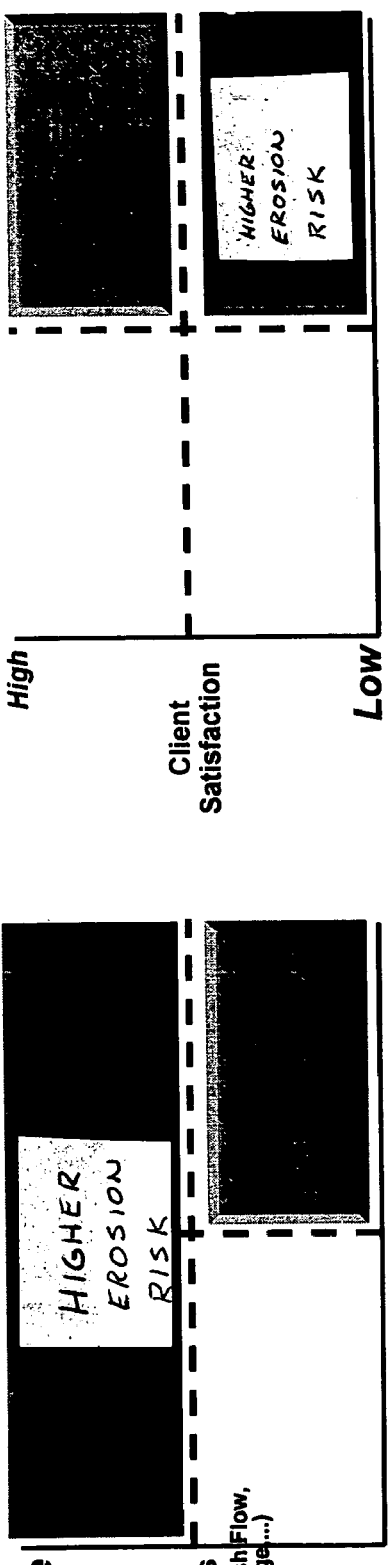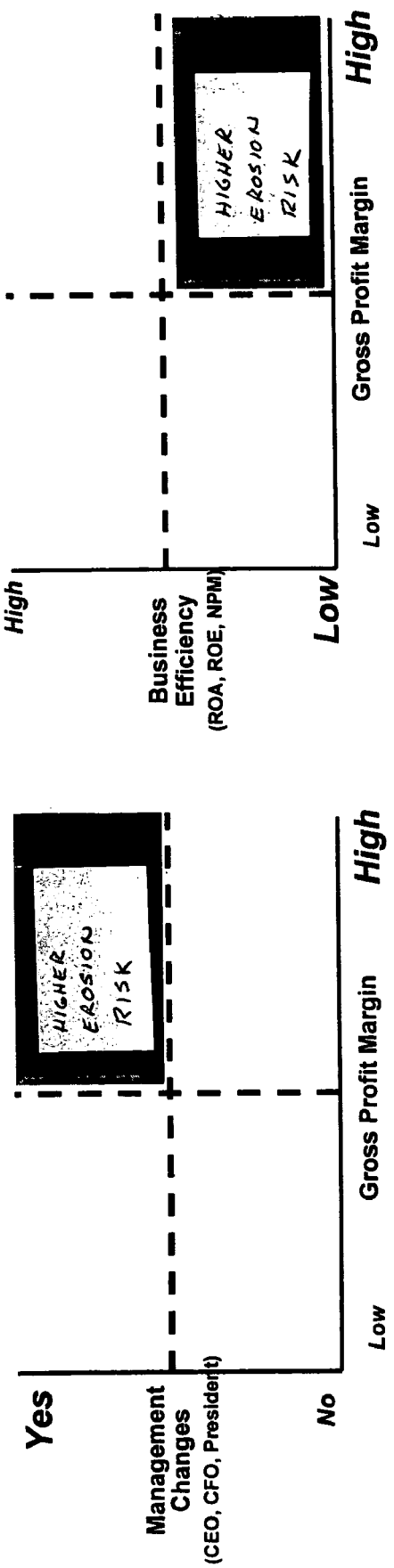
FIGURE 7A FIGURE 7B FIGURE 7C FIGURE 7D

RISK SCORE

| Ticker ▲Name | | Financials | Client Satisfaction | GPM | Significant Developments | Erosion Repeat | Report |
|---|---|---|---|---|---|---|---|
| Company ABC | ■ High Risk | ■ Under Stress | ▨ Low | ■ | ▨ Low Impact | ▨ No Previous Erosion | Complete |
| Company 12367 | ▨ At Risk | Average | ▨ Low | ■ | ▨ Low Impact | ▨ No Previous Erosion | Complete |
| Company 134456889 | ▨ Low Risk | ▨ Solid | ☐ Data not available | ☐ | ■ High Impact | ▨ No Previous Erosion | Incomplete |
| MNP Corporation | ▨ Low Risk | ▨ Solid | Average | ☐ | ■ High Impact | ▨ No Previous Erosion | Incomplete |
| Enterprise 123 | ▨ At Risk | ▨ Challenging | ▨ Above Average | ☐ | ■ High Impact | ▨ No Previous Erosion | Incomplete |
| Company 123 (formerly Company ASA) | ■ High Risk | ■ Under Stress | ▨ Low | | ■ High Impact | ▨ No Previous Erosion | Complete |
| Company 6798200 (new expanded agreement) | ▨ At Risk | Average | ☐ Data not available | ▨ | ■ High Impact | ■ Previous Erosion | Incomplete |
| QWC Corporation | ▨ Low Risk | ☐ Insufficient Data | ■ Very Good | ▨ | ▨ Low Impact | ■ Previous Erosion | Complete |
| LLL Insurance Company 6798200 | Medium Risk | Average | ■ Very Good | | ▨ Low Impact | ■ Previous Erosion | Complete |
| HNI Enterprises | ▨ Low RISK | Average | ☐ Data not Available | ☐ | ▨ Low Impact | ▨ No Previous Erosion | Incomplete |

FIGURE 9

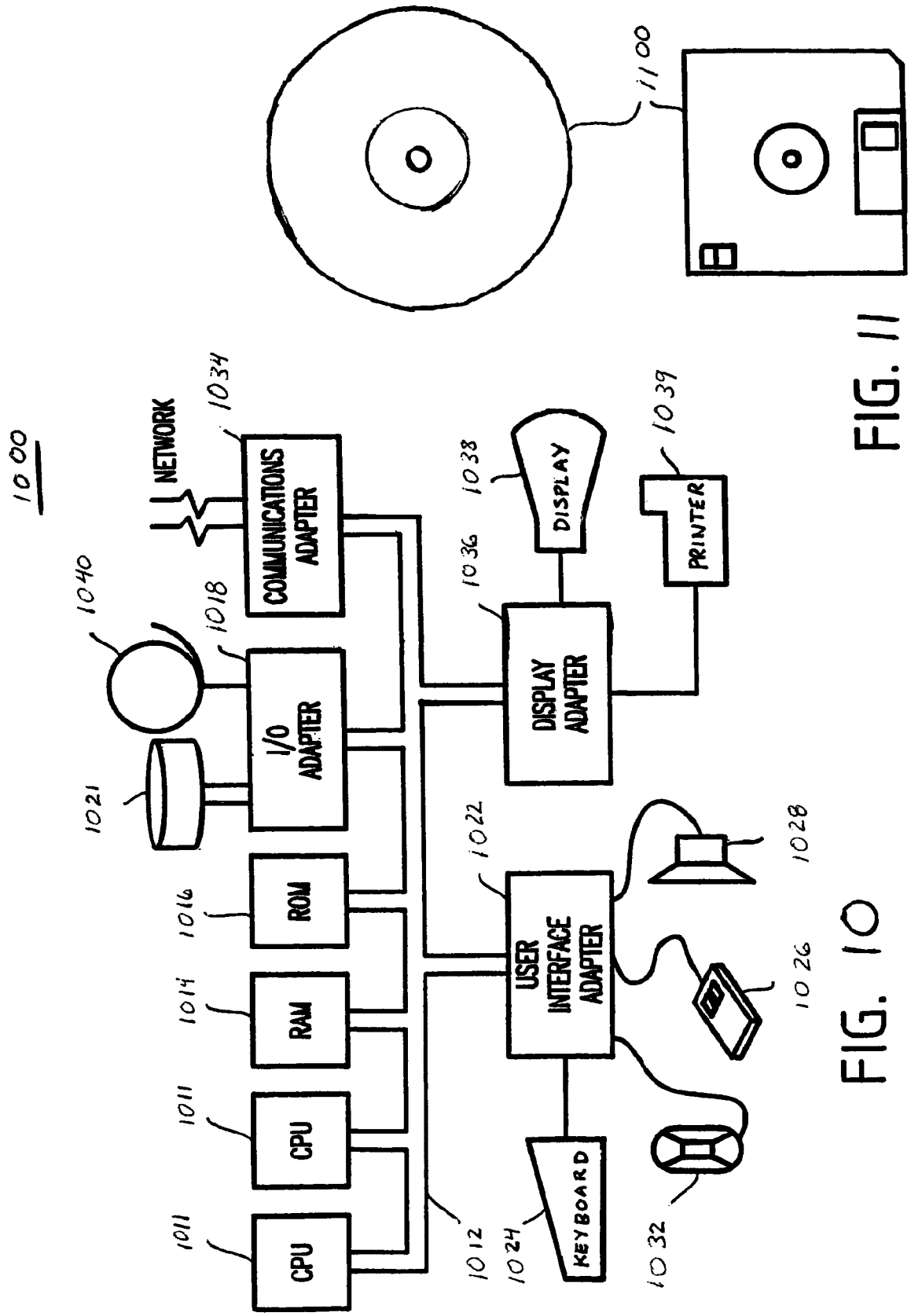

SYSTEM, METHOD FOR DEPLOYING COMPUTING INFRASTRUCTURE, AND METHOD FOR IDENTIFYING CUSTOMERS AT RISK OF REVENUE CHANGE

CROSS-REFERENCE TO RELATED APPLICATION

The present application is related to U.S. patent application Ser. No. 10/942,803, filed on Sep. 17, 2004, to Mojsilovic et al., entitled "SYSTEM, METHOD FOR DEPLOYING COMPUTING INFRASTRUCTURE, AND METHOD FOR CONSTRUCTING LINEARIZED CLASSIFIERS WITH PARTIALLY OBSERVABLE HIDDEN STATES", which is incorporated herein by reference, in its entirety.

BACKGROUND OF THE INVENTION

1. Field of the Invention

The present invention generally relates to a system and method for identifying customers at risk of revenue change (e.g., loss or gain), and more particularly to a system and method for identifying companies, organizations, accounts, or clients at risk of revenue change (e.g., revenue loss or gain) and sources of such revenue change (e.g., revenue loss or gain).

2. Description of the Related Art

Over the last 10 years there has been a proliferation of large and expensive services contracts. Motivated by a need to reduce cost, control expenses and increase efficiency, more and more companies are relying on service providers to handle a part of their non-core business. For example, companies may rely on services providers for IT outsourcing, various aspects of IT service and maintenance, business process outsourcing, or business consulting.

Over the last three decades, there has been an explosion of information technology (IT) infrastructure, followed by increased sophistication in information processing, business analytics and application software. As the technology has continued to evolve, IT spending has become one of the dominant line items in companies' budgets.

Furthermore, in today's marketplace, businesses have realized that in order to be competitive and efficient, they need to develop IT infrastructure, invest in state-of the art applications, business processes and practices. Given constant advances in technology and continually changing business practices, where some of the "latest" solutions could become obsolete in less than a year, a large number of companies have struggled to keep their IT investments up to date, to revitalize their legacy systems, optimize new investments, and maintain current business practices, while keeping the IT spending under control.

To solve this problem, many businesses outsource a part of their IT operations, or hire an external company to perform some of their business processes or service some non-essential components of their business. This has contributed to the growth of services business, and today there are numerous service providers and firms that specialize in operating IT efficiently, running complex business processes, or providing high-level strategy consulting.

These services contracts are typically very expensive and are delivered through a multi-year engagement, which yields a substantial amount of revenue to the services provider.

However, if for any reason a company receiving the service decides to terminate the agreement (or a portion of it), downsize the amount of services needed under the agreement to meet a decrease in demand ("re-scoping"), or renegotiate the agreement to achieve a better price, the services provider may incur a significant change (e.g., revenue loss) of revenue (often in a range of several billion or hundreds of millions of dollars).

As a result, services providers are interested in tracking their portfolio of customers and forecasting the risk of severe revenue loss.

The known approaches are typically based on the use of customer satisfaction reports and metrics, in which, in order to determine the "riskiness" of a contract, each metric is multiplied by empirically determined weight factors and the risk score is computed as the sum of these weighted features.

However, the conventional approaches are not capable of measuring the risk exposure in today's complex environment (e.g. under the influence of multiple, often mutually-related, risk factors), and for that matter, do not even contemplate measuring such risk exposure based on complex risk factors.

SUMMARY OF THE INVENTION

In view of the foregoing and other exemplary problems, drawbacks, and disadvantages of the conventional methods and structures, an exemplary feature of the present invention is to provide a system and method for measuring account risk, by addressing different dimensions of services business, identifying customers whose accounts are at risk, as well as identifying the subcomponents and issues that are related to the risk level of the given account.

Another exemplary feature of the present invention is to provide a process or methodology for scoring a large number of client accounts for the purpose of identifying companies (businesses or accounts) that have an increased likelihood (propensity, or risk exposure) to terminate, re-scope, or renegotiate a contract (or a part of it) (e.g., contract erosion), or take any action that might lead to a severe change of revenue (e.g., revenue loss or gain) to the service provider.

In one exemplary aspect of the present invention, a method for identifying a customer at risk of revenue change includes computing a risk score based on a plurality of risk factors.

In another exemplary aspect of the present invention, computing the risk score includes computing a plurality of risk scores based on each of the plurality of risk factors.

In still another exemplary aspect of the present invention, the plurality of risk factors includes a plurality of mutually-related risk factors.

In yet another exemplary aspect of the present invention, the method further includes predicting an overall risk score based on the plurality of risk scores.

In another exemplary aspect of the present invention, the method further includes predicting an amount of revenue at risk based on the risk score.

In still another exemplary aspect of the present invention, the method further includes predicting a probability of revenue change based on the risk score.

In another exemplary aspect of the present invention, the revenue change includes at least one of revenue loss and revenue gain.

In another exemplary aspect of the present invention, the method includes identifying sources of change in revenue of the customer based on the risk score.

In another exemplary aspect of the present invention, the method includes performing an analysis of publicly available information of the customer and extracting comparative data for the customer from the analysis.

In another exemplary aspect of the present invention, the method includes performing an analysis of internal data of the customer and extracting comparative data for the customer based on the analysis.

In one exemplary aspect of the present invention, the publicly available information includes client developments metrics and client performance metrics. In another exemplary aspect of the present invention, the publicly available information includes at least one of financial metrics, business metrics, management changes, mergers, acquisitions, earnings pre-announcements, divestitures, share repurchases, expansions, new markets, layoffs, reorganizations, restructurings, initial public offerings, litigation, government probes, and regulatory probes.

In one exemplary aspect of the present invention, the internal data includes at least one of level of satisfaction metrics, profitability metrics, and prior erosion metrics. In another exemplary aspect of the present invention, the internal data includes at least one of revenue information, profit information, customer surveys, types of services sold, length of a contract, value of a contract, information on previous revenue changes, and information on inventory changes.

In another exemplary aspect of the present invention, the method includes evaluating the plurality of risk factors, and combining the plurality of risk factors into an overall risk score.

In another exemplary aspect of the present invention, the method includes inputting the plurality of risk factors, accumulating data based on historical data, and building a mathematical model based on the plurality of risk factors and the historical data.

In another exemplary aspect of the present invention, the method includes receiving the plurality of risk factors, receiving data based on historical data, and building a mathematical model based on the plurality of risk factors and the historical data.

In other exemplary aspects of the present invention, the mathematical model adapts to (e.g., learns from) the historical data and/or is responsive to the historical data.

In other exemplary aspects of the present invention, the plurality of risk factors includes positive and negative risk factors and/or contribute to at least one of revenue gain and revenue loss.

In still another exemplary aspect of the present invention, a method for identifying an entity at risk of revenue change includes identifying historic examples of at least one of the entity and other entities, extracting risk factors for the entity based on analysis of at least one of publicly available information and internal data of the entity, and predicting a probability that the entity will take an action which will result in a revenue change greater than a predetermined threshold.

In another exemplary aspect of the present invention, the method includes predicting a contribution of at least one risk factor to an overall risk score and/or predicting an amount of revenue at risk.

In another exemplary aspect of the present invention, the action of the at least one customer includes at least one of terminating a business relationship, terminating a contract, re-scoping a business model, re-scoping a business agreement, and renegotiating a service contract.

In another exemplary aspect of the present invention, a method for identifying at least one account at risk of revenue change includes constructing a set of historical positive examples of stable accounts, constructing a set of historical negative examples of unstable accounts, constructing a set of contract detail features for the set of historical positive examples and the set of historical negative examples within a predetermined period of time, and building a mathematical predictive model that predicts a probability of at least one example from the set of historical positive examples and the set of historical negative examples, based on the set of contract detail features.

In another exemplary aspect of the present invention, the mathematical predictive model is optimized to produce a best prediction against the set of historic positive examples and the set of historical negative examples.

In another exemplary aspect of the present invention, the method includes extracting a set of features for the at least one account within a predetermined period of time, applying the predictive mathematical model to the extracted features for the at least one account, and computing a risk score including a probability that the at least one account belongs to one of the set of historical positive examples and the set of historical negative examples.

In another exemplary aspect of the present invention, the risk score represents a risk of revenue change of the at least one account.

In another exemplary aspect of the present invention, the set of features of the at least one account includes at least one of contract detail features, internal information, and external information, of the at least one account.

In another exemplary aspect of the present invention, the set of features of the at least one account includes at least one of contract detail features, financial features, business features, news-based features, customer satisfaction features, contract profitability features, contract price features, and past behavior features of the at least one account, within a predetermined period of time.

In another exemplary aspect of the present invention, the stable accounts include accounts without revenue loss within a predetermined period of time.

In another exemplary aspect of the present invention, the unstable accounts include accounts including revenue loss within a predetermined period of time.

In another exemplary aspect of the present invention, the unstable accounts include accounts including a terminated contract, a re-scoped contract, a renegotiated contract, and an unplanned decrease in revenue to a provider on a predetermined date within a predetermined period of time.

In another exemplary aspect of the present invention, the contract detail features for the set of historical positive examples and the set of historical negative examples includes at least one of financial features, business features, news-based features, customer satisfaction features, contract profitability features, contract price features, and past behavior features, within a predetermined period of time.

In another exemplary aspect of the present invention, a method for forecasting an amount of revenue change includes constructing a set of historical examples of accounts and revenue streams to a service provider prior to a date within a predetermined period of time, for each of the historical examples, constructing a set of historical example features including at least one of contract detail features, internal information, and external information, building a mathematical predictive model for predicting the amount of revenue change for one of the historical examples, extracting a set of features including at least one of contract detail features, internal information, and external information, for a plurality of accounts to be tracked with respect to revenue change, wherein the set of features for the plurality of accounts are extracted during a period of time preceding a date for which a forecast is sought, applying the mathematically predictive model to the extracted set of features for each account of the plurality of accounts, computing a revenue forecast for each account of the plurality of accounts, and computing risk components representing a contribution of at least one feature of the set of features for the plurality of accounts to an overall revenue change.

In another exemplary aspect of the present invention, each example is constructed for a period of time immediately preceding the date.

In another exemplary aspect of the present invention, the one example includes a feature set and the model is optimized to produce a best prediction against the set of historical examples.

In another exemplary aspect of the present invention, a method for identifying an account at risk of revenue change includes categorizing client accounts into a set of categories, constructing a set of historical examples of accounts for each of the set of categories for a date within a predetermined period of time preceding a date for which identification is sought, for each example, constructing a set of features including at least one of contract detail features, internal information, and external information, within the predetermined period of time, building a mathematical predictive model for predicting a probability of one example, which includes a feature set, belonging to one of the set of categories of clients, wherein the mathematical predictive model is optimized to produce a best prediction against the set of categories of clients, extracting another set of features for a plurality of accounts to be tracked against the risk of revenue change, wherein the another set of features are extracted during a period of time preceding the date for which identification is sought, applying the mathematical predictive model to the extracted another set of features for each account of the plurality of accounts, computing at least one of a risk score and a probability that an account is within one category of the set of categories of clients, wherein at least one of the risk score and the probability represents a score indicating a risk of revenue change of the account, and computing risk components representing a contribution of at least one feature of the set of features for the account to an overall account risk score for the account.

In another exemplary aspect of the present invention, a method for identifying an account at risk of revenue change includes building a mathematical model, based on a set of different inputs for the account and historical data, for simulating a present situation of the account, predicting risk scores for the account, and combining the risk scores to determine an overall risk of revenue change for the account.

In another exemplary aspect of the present invention, a system of identifying at least one account at risk of revenue change includes a computing unit that computes a risk score based on a plurality of risk factors for the at least one account.

In another exemplary aspect of the present invention, the system includes a predicting unit that predicts a risk of revenue change of the at least one account.

In another exemplary aspect of the present invention, the system includes a predicting unit that predicts an amount of revenue at risk based on the risk score.

In another exemplary aspect of the present invention, a system of identifying an account at risk of revenue change includes means for computing a risk score for the at least one account based on a plurality of risk factors, and means for predicting a risk of revenue change of the at least one account based on the risk score.

In another exemplary aspect of the present invention, the system includes means for predicting an amount of revenue at risk of revenue change based on the risk score.

In another exemplary aspect of the present invention, a signal-bearing medium tangibly embodying a program of machine-readable instructions executable by a digital processing apparatus to perform a method for identifying a customer at risk of revenue change, includes computing a risk score based on a plurality of risk factors.

In another exemplary aspect of the present invention, a method of deploying computing infrastructure in which computer-readable code is integrated into a computing system, and combines with the computing system to perform a method for identifying a customer at risk of revenue change, includes computing a risk score based on a plurality of risk factors:

The present invention generally relates to long-term contracts (such as business outsourcing, information technology (IT) service, IT outsourcing, business consulting, etc.) and, more particularly, to a method for assisting the identification of companies, organizations or any other clients, that might be inclined to terminate a contract, renegotiate a contract, reduce the scope of a contract, or take any action which might lead to a revenue change (e.g., revenue loss or gain) to a services provider.

While the invention is exemplarily described with respect to these exemplary services, those skilled in the art will recognize that the invention is not limited to the exemplary embodiments and can be applied to address any type of business relationship.

The exemplary features of the present invention provide an improved and more accurate system and method for measuring account risk, by addressing different dimensions of services business, identifying customers whose accounts are at risk, as well as identifying the subcomponents and issues that are related to the risk level of the given account.

The exemplary features of the present invention provide a system and method for identifying companies, customers, or accounts, etc, at risk of revenue change that is more accurate than the conventional systems and methods, while maintaining a minimum number of steps necessary. Thus, the exemplary features of the present invention are accurate and highly efficient.

Other exemplary features of the present invention enable the data for the subject company, customer, or account to be used to determine the risk of revenue loss, or on the other hand, the company data and/or historical past data examples to be used to train the model based on what the company has done in the past.

Moreover, the exemplary features of the present invention can focus on predetermined time periods such that data over a previous time period, data during a current time period, and/or a comparison of the previous time period and the current time period can be used to get an idea of what is happening in a current time period (e.g., to predict a probability of revenue loss or gain, or to predict a probability that the subject company, customer, or account is similar to a known historical example).

The exemplary features of the system and method of the present invention provide an environment for assessing the overall health of a relationship with a customer (e.g., "at a glance"), and moreover, can provide a brief summary view of a customer, a customer's financial health, developments, satisfaction, and internal information, and therefore, is particularly useful and advantageous for use as a tool for account managers, account teams and executives.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIGS. 7A-7D illustrate exemplary graphs comparing exemplary risk factors according to illustrative, non-limiting embodiments of the present invention;

FIG. 9 illustrates an exemplary table of risk factors and risk scores for exemplary companies according to illustrative, non-limiting embodiments of the present invention;

FIG. 10 illustrates an exemplary hardware/information handling system 1000 for incorporating the present invention therein; and FIG. 11 illustrates a signal bearing medium (e.g., storage medium 1100) for storing steps of a program of a method according to the present invention.

DETAILED DESCRIPTION OF EXEMPLARY EMBODIMENTS OF THE INVENTION

Figure 1:
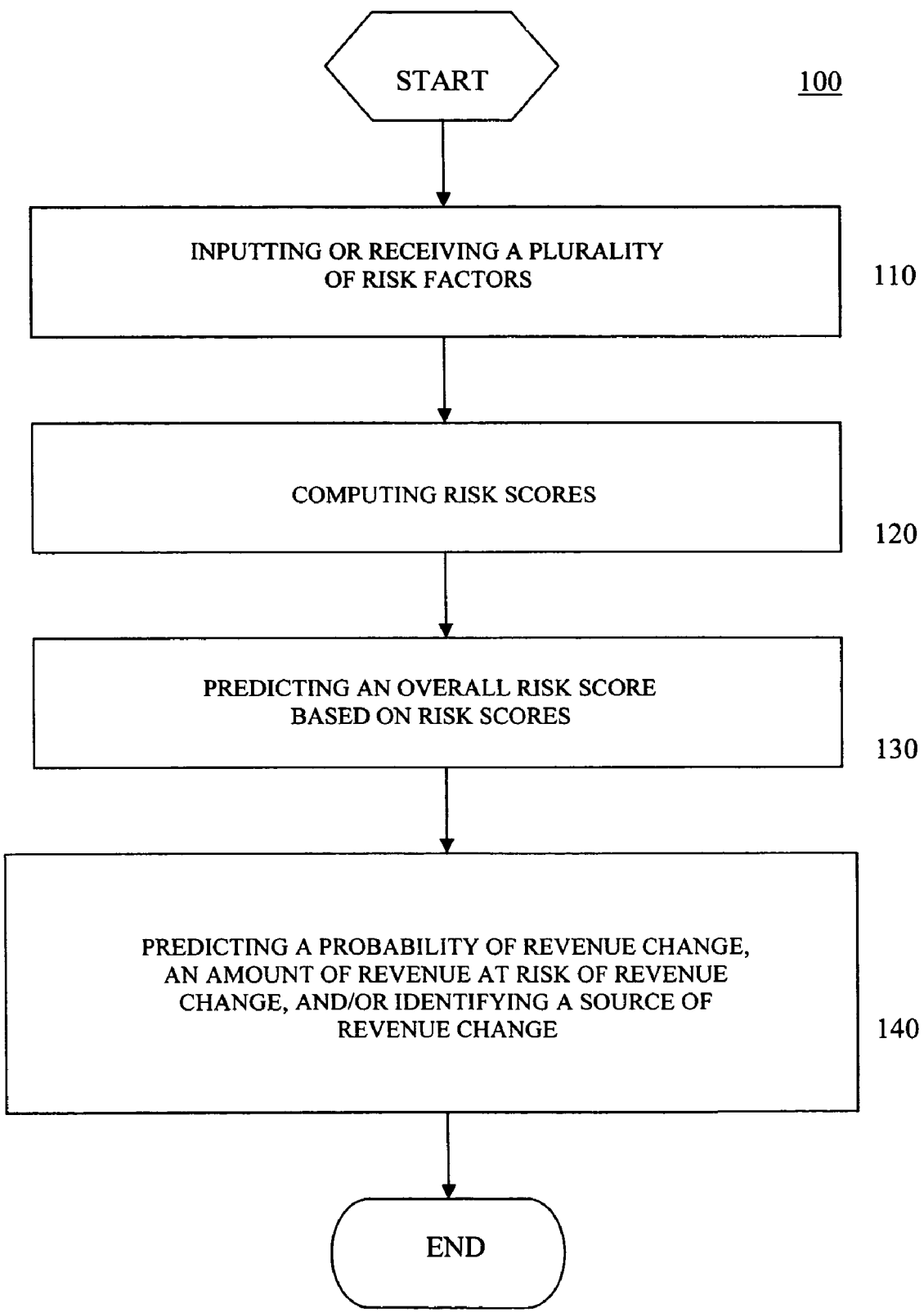
FIG. 1 illustrates a method 100 according to an exemplary, non-limiting embodiment of the present invention.

Referring now to the drawings, and more particularly to FIGS. 1-11, there are shown exemplary embodiments of the method and structures according to the present invention.

If for any reason a company receiving the service decides to terminate the agreement (or a portion of it), downsize it to meet a decrease in demand ("re-scoping"), or renegotiate it to achieve a better price, the service provider may incur a significant change (e.g., revenue loss) of revenue (often in a range of several billion or hundreds of millions of dollars).

On the other hand, if for any reason a company receiving the service needs to increase service to meet an increase in demand, the service provider also may incur a significant change (e.g., revenue gain) of revenue.

As a result, service providers are interested in tracking their portfolio of customers and forecasting the risk of severe revenue change (e.g., revenue loss or gain).

As mentioned above, the known approaches are typically based on the use of customer satisfaction reports and metrics, in which, in order to determine the "riskiness" of a contract, each metric is multiplied by an empirically determined weight factors and the risk score is computed as the sum of these weighted features.

However, the conventional approaches do not (and cannot) measure the risk exposure in a complex environment (e.g. under the influence of multiple, often mutually-related, risk factors).

Service providers are interested in tracking their portfolio of customers and forecasting the risk of such complex factors, such as an early termination, re-scoping, renegotiation, or any other form of severe revenue change (e.g. revenue loss or gain).

Companies generally terminate, re-scope, or renegotiate their service contracts due to one (or a combination) of the following exemplary reasons:

a) The company is experiencing financial troubles and cannot afford to maintain the present contract according to its agreed upon terms (e.g., in its full size or scope);

b) The contract has not delivered expected cost-savings or improvements in business efficiencies;

c) The company is not satisfied with the provider's quality of service;

d) The company deems the provider's service too expensive; or e) The market is getting increasingly competitive with constantly decreasing prices and changes in contract structure.

Indeed, the clauses for periodic service and price benchmarking are becoming a standard part of a service contract.

Thus, an exemplary feature of the present invention is to provide a system and method for measuring account risk, by addressing different dimensions of services business, identifying customers whose accounts are at risk, as well as identifying the subcomponents and issues that are related to the risk level of the given account.

One exemplary aspect of the present invention provides a system or method for scoring a large number of client accounts for the purpose of identifying companies (e.g., businesses or accounts) that have an increased likelihood (e.g., propensity or risk exposure) to terminate, re-scope, renegotiate a contract (or a part of it), or take any action that might lead to a severe change (e.g., loss or gain) of revenue to the service provider.

For example, as shown in the exemplary aspect of the invention illustrated in FIG. 1, a method 100 for identifying a customer at risk of revenue change includes inputting or receiving a plurality of risk factors 110 and computing risk scores 120.

That is, an exemplary aspect of the present invention takes multiple factors (e.g., a plurality of risk factors, different inputs, mutually-related factors, and/or comparative data) to determine whether a company or account (or a number of companies and/or accounts) is at risk of revenue change.

The exemplary method can include predicting an overall risk score 130 based on the risk scores. For example, an exemplary embodiment of the present invention combines the risk scores into a single metric (e.g., overall risk score) representing the erosion risk for the subject account.

Moreover, the exemplary invention can include predicting a probability of revenue change, an amount of revenue at risk of revenue change, and/or identifying a source of revenue change 140.

The exemplary embodiment can include computing a single risk score or a plurality of risk scores based on, for example, each of the plurality of risk factors.

Another exemplary aspect of the present invention provides a methodology for measuring account risk, by addressing different dimensions of services business, identifying customers whose accounts are at risk, as well as identifying the subcomponents and issues that are related to the risk level of the given account.

Figure 2:
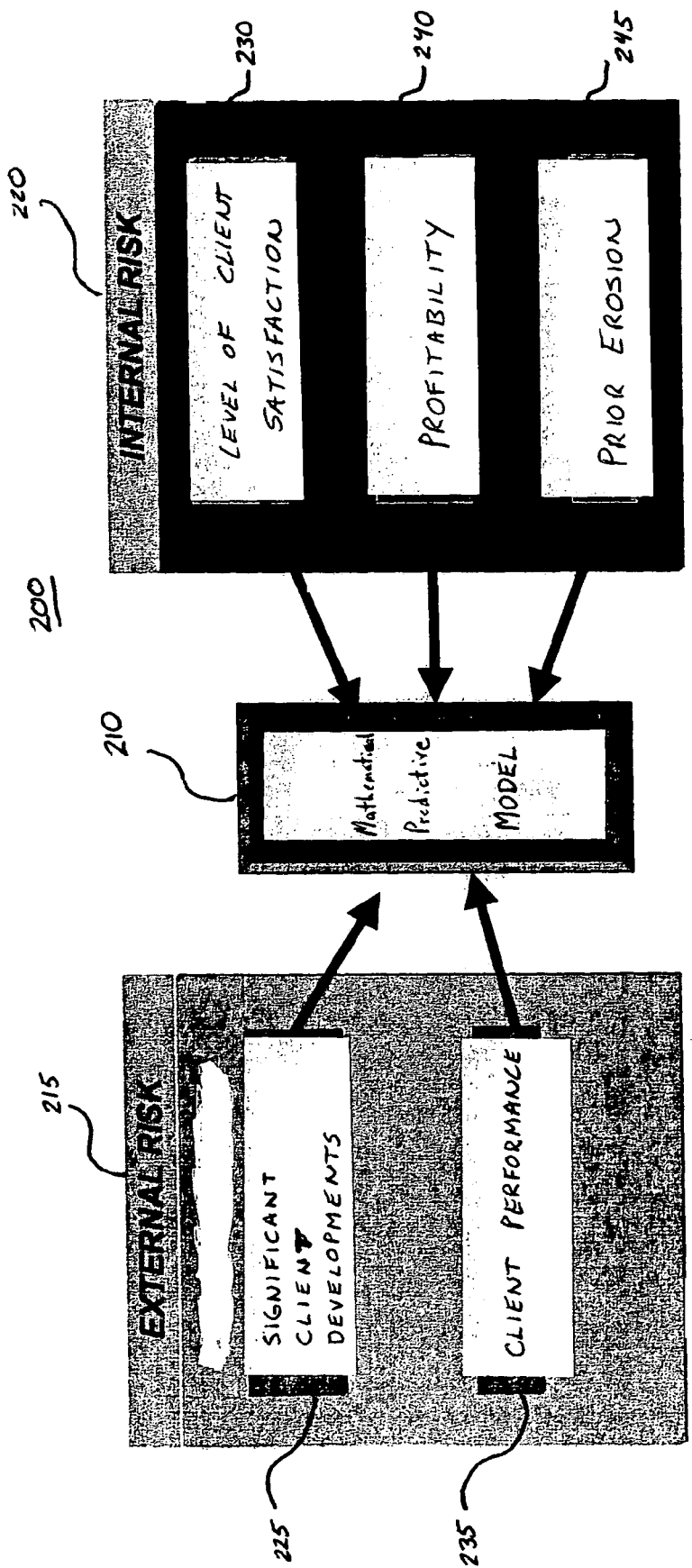
FIG. 2 illustrates a system 200 according to an exemplary, non-limiting embodiment of the present invention.
Figure 3:
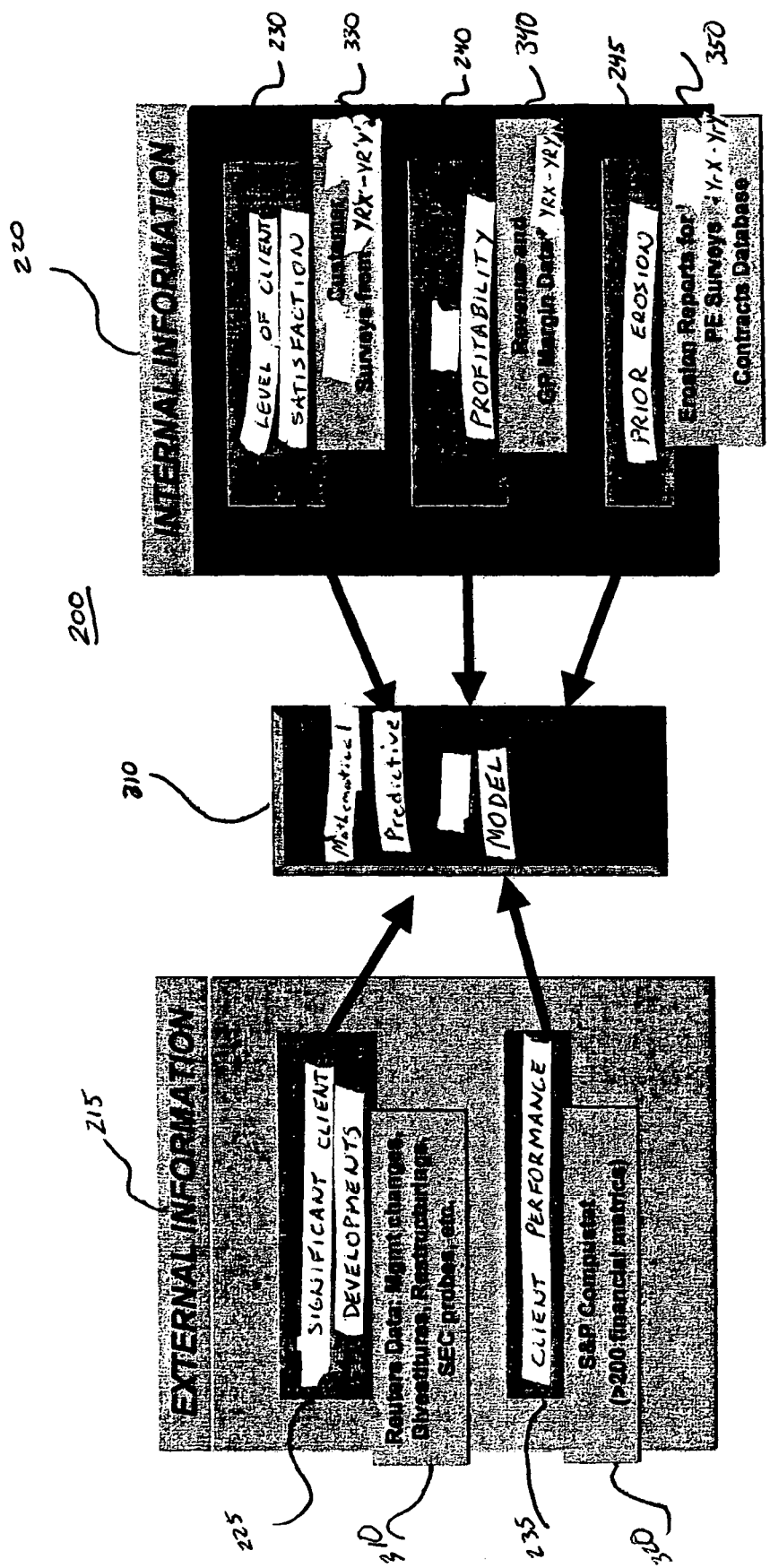
FIG. 3 illustrates another exemplary, non-limiting embodiment of the present invention.

For example, in the exemplary embodiments of the invention illustrated in FIGS. 2 and 3, a mathematical predictive model 210 can be built or devised for measuring account risk by focusing on key erosion drivers (e.g., sources of data), which may include external risk factors 215 and internal risk factors 220.

The external risk factors can include significant client developments 225 and/or client performance metrics 235, among other things. On the other hand, the internal risk factors 220 can include level of client satisfaction 230, profitability 240, and prior erosion 245, among other things.

These key inputs into an exemplary predictive model. It is generally held that companies terminate, re-scope, or renegotiate their service contracts due to one (or a combination) of the following reasons: a) The company is experiencing financial troubles and cannot afford to maintain the contract in its full size; b) The contract has not delivered expected cost-savings or improvements in business efficiencies; c) The company is not satisfied with the provider's quality of service; d) The company deems the provider's service too expensive; and e) The market is getting increasingly competitive with constantly decreasing prices and changes in contract structure. The clauses for periodic service and price benchmarking are becoming a standard part of a service contract. Therefore, in order to develop a risk-scoring model, we need to be able to collect inputs (information) that captures these key factors.

As illustrated in FIG. 3, the significant client developments 225 can include data 310, such as Reuters Data, including management changes, divestitures, restructurings, governmental probes (e.g., SEC probes), etc. On the other hand, client performance 235 can include metrics 320 derived from accepted financial sources, such as S&P Compustat (e.g., greater than 200 financial metrics), etc.

Referring to FIG. 3, examples of the data sources used to capture these factors are illustrated. As noted above, financial performance of a company is one of the key drivers of decision to terminate the agreement. Relative financial performance after initiation of an outsourcing operation is also crucial for assessing risk from the vendor's perspective, as well as quantifying the overall impact of the outsourcing decision on the client's business performance. For these reasons, one of the key data inputs for our analyses are client financial and business metrics, such as Stock Price, Sales, General & Administrative expenses (SG&A), Free Cash Flow, Return on Assets (ROA), etc. This data would exemplarily be extracted from Standard and Poor's Computstat database.

Management changes and other corporate events such as restructurings, divestitures, mergers and acquisitions are often mentioned as possible precursors to contract termination. Extensive historical data on corporate management changes and significant corporate developments would exemplarily come from Reuters. The latter set of data includes a comprehensive labeling of 24 different types of events, such as mergers and acquisitions, layoffs, equity refinancing, debt refinancing, restructuring, joint ventures, share repurchases, etc., along with a specification of the significance of the event as Low, Medium, or High. For assessing risks of a contract, client satisfaction and contract terms (such as pricing, length of the contract, benchmarking clauses) are important factors potentially impacting the success of the outsourcing arrangement. Finally, the models also considers the previous pricing terms and conditions of the contract, and the previous history of contract renegotiation.

The level of client satisfaction 230 can be based on customer surveys 330 gathered during a predetermined period of time (e.g., from year '01 to year '03). The profitability (e.g., of the service provider) 240 can include revenue and/or gross profit margin (GPM) data 340 for a predetermined period of time (e.g., year '01 to year '03). On the other hand, the prior erosion 245 can include erosion reports for a predetermined period of time (e.g., year '01 to year '03), prior erosion surveys, and/or contracts databases 350.

As would be understandable to one of ordinary skill in the art, other external and internal information can be used to evaluate the risk of revenue loss, according to the present invention.

In addition to scoring accounts with respect to their risk of revenue change (e.g., revenue loss or gain), another exemplary aspect of the present invention provides a system and method for identifying key sources of risk of revenue change (e.g., source of revenue loss or revenue gain).

For example, according to another exemplary aspect of the present invention, for a given service provider and a set of client accounts, the mathematical predictive model can be trained to learn from past behavior of a subject account or other accounts. That is, mathematical modeling and statistical analysis can be used to understand and capture key differences between eroded accounts (e.g., negative accounts) and non-eroded accounts (e.g., positive accounts).

Figure 4:
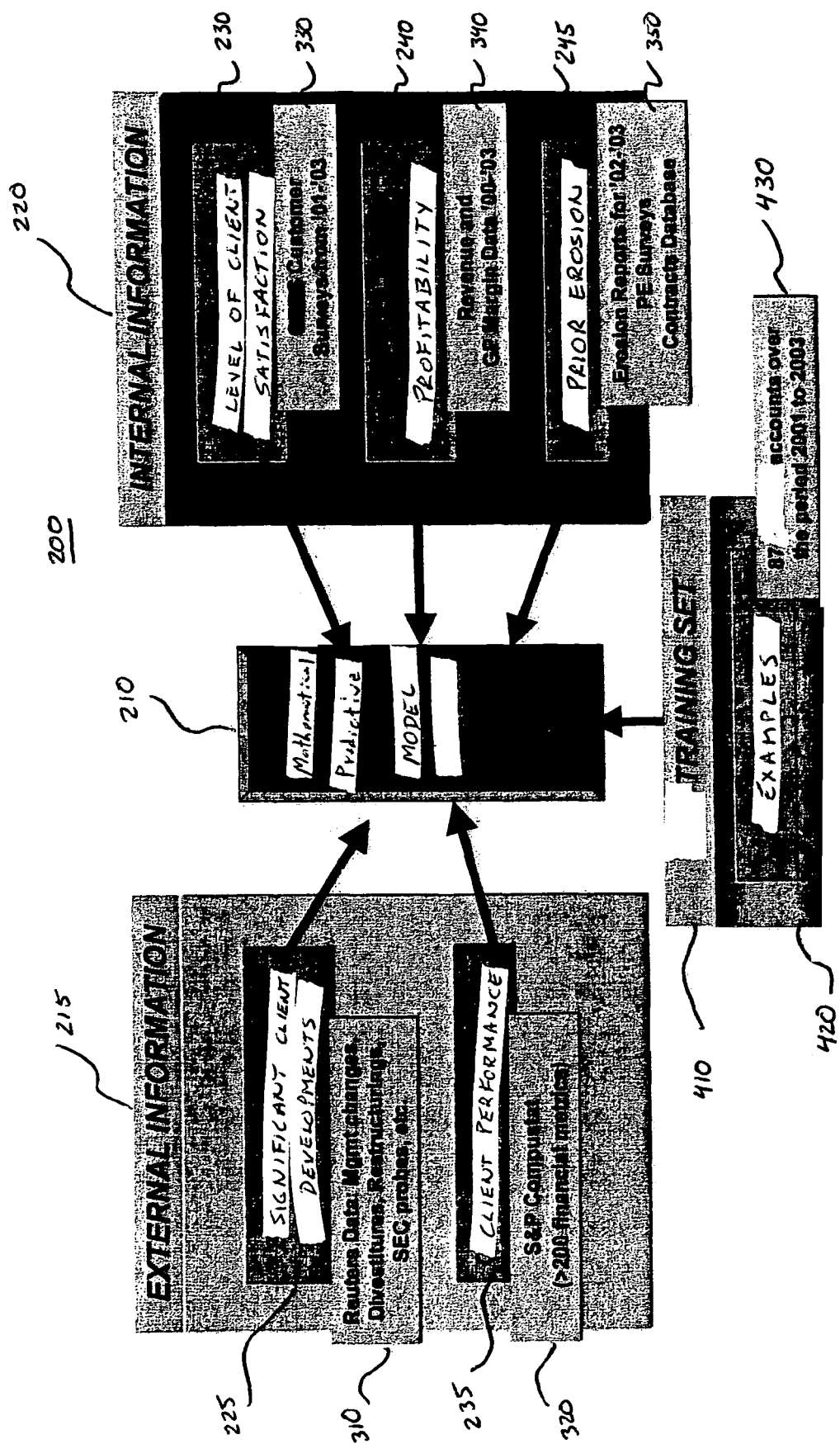
FIG. 4 illustrates another exemplary, non-limiting embodiment of the present invention.

With reference to the exemplary aspect illustrated in FIG. 4, a training set of data 410 can be inputted, captured, or accumulated for training a mathematical predictive model according to an exemplary aspect of the present invention. Referring to FIG. 4, the process of defining training sets used in risk models is illustrated. The model requires identification of "positive" examples—companies that took a specific business action (terminated or downsized a contract), as well as "negative" examples (i.e. companies that did not take the corresponding business action.)

In the training step or phase, an exemplary embodiment of the present invention constructs a set of examples 420 of client accounts, which have been terminated, re-scoped or renegotiated their contracts with a providing company (e.g., "negative" examples), including the date of "termination".

The exemplary embodiment also constructs a set of examples of client accounts that had no history of revenue loss, prior to a date of interest (e.g., "positive" examples).

In case of "negative" examples, the time-window (e.g., the predetermined period of time) typically refers to a period preceding contract termination/change (e.g., examples for 87 accounts over the period from year '01 to year '03) 430.

Therefore, the exemplary invention is capable of learning from past behavior (e.g., from "positive" examples and "negative" examples). Thus, the method and system are adaptive.

For each example 420 (e.g., "positive" and "negative") during a time window of interest (e.g., during the predetermined time period 430), an exemplary aspect of the present invention constructs a set of features, which may include, among other things:

a) financial and business performance metrics;
b) metrics that characterize client satisfaction with provider's quality of service and service delivery;
c) metrics that characterize provider's price;
d) news-based metrics on significant changes in client's company (e.g., corporate changes); and/or
e) event-based metrics that characterize whether a client has a history of contract termination.

Figure 5:
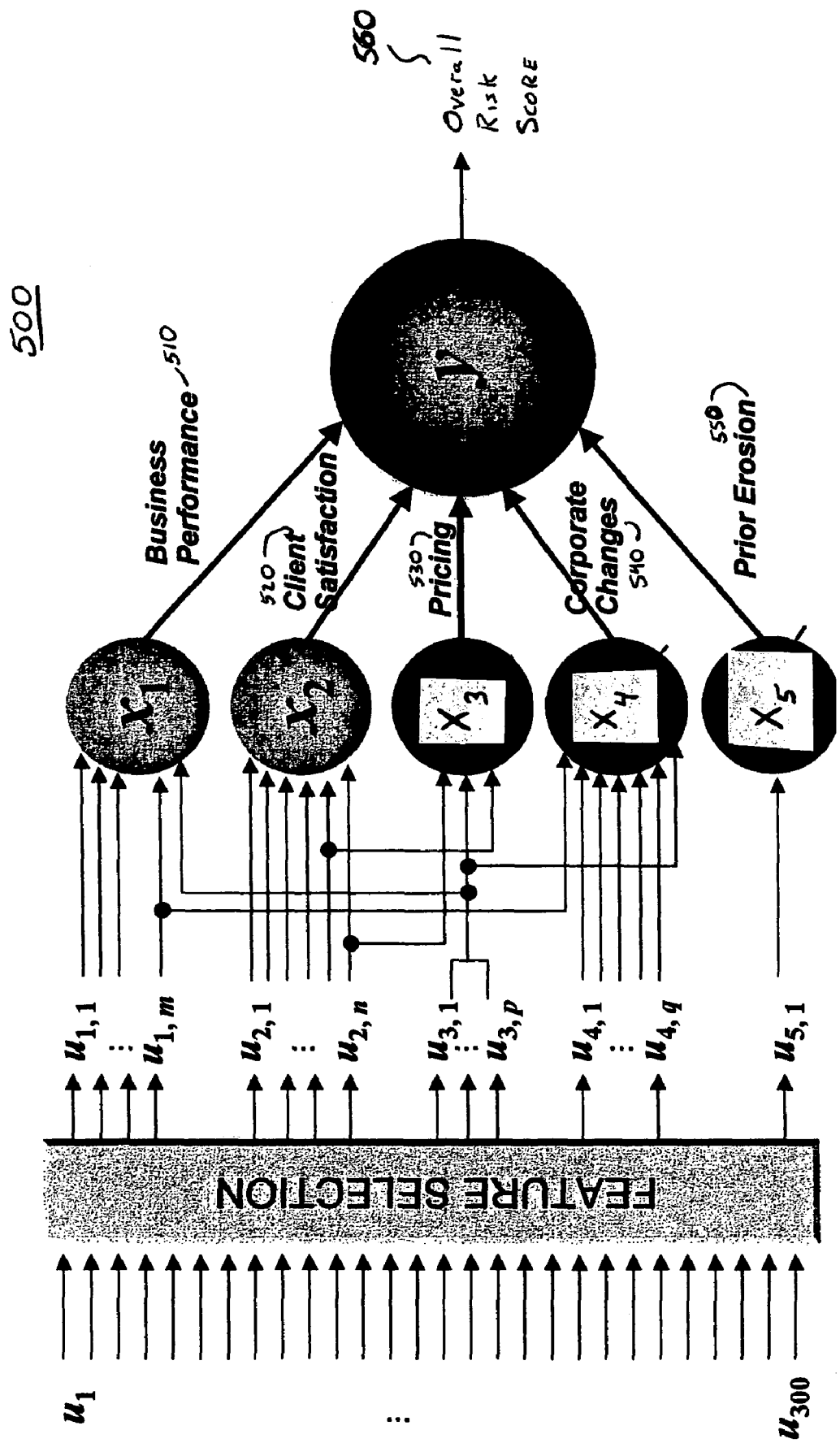
FIG. 5 illustrates an exemplary, non-limiting embodiment of an exemplary model 500 according to the present invention.
Figure 6A:
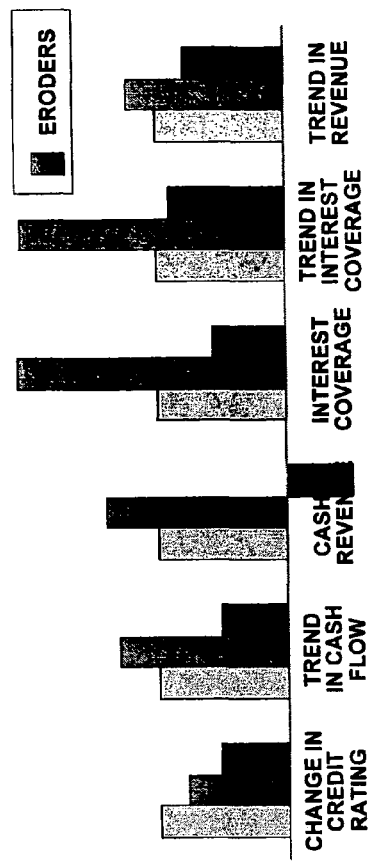
FIGS. 6A-6D illustrate exemplary graphs comparing exemplary risk factors according to illustrative, non-limiting embodiments of the present invention.
Figure 6B:
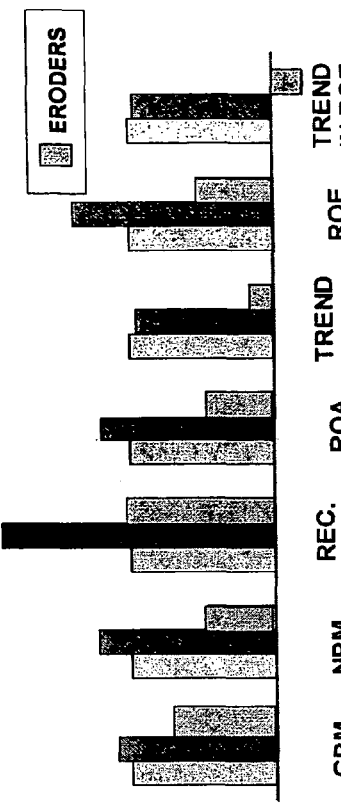
Figure 6C:
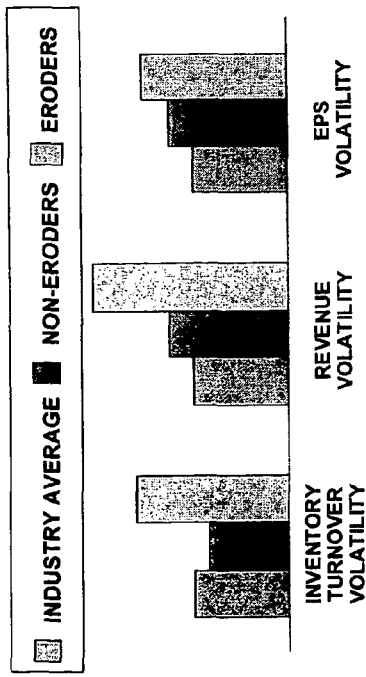
Figure 6D:
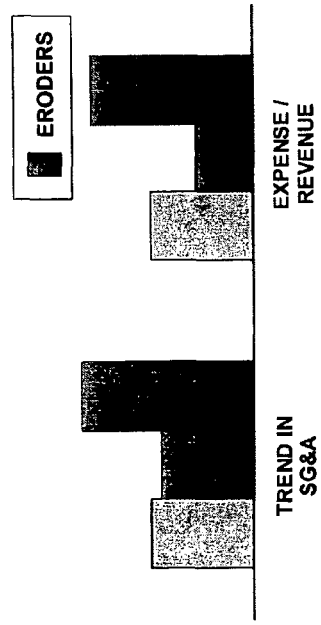

Next, a method according to the claimed invention includes building a mathematical model 210 as illustrated in FIG. 4, or model 500 as illustrated in FIG. 5, designed to compute an overall risk score 560 of contract termination, as well as individual scores (e.g., $x_1$, $x_2$, $x_3$, $x_4$, and $x_5$) related to, for example, each of the aforementioned risk factors (e.g., business performance 510, client satisfaction 520, pricing 530, corporate changes 540, and prior erosion 550). The model (e.g., model 500) can be designed by applying a statistical modeling approach, a machine learning approach, or an optimization approach, on the aforementioned set of examples (or other examples), and can be optimized to produce the best forecast against these examples.

Particularly, in a scoring step or phase, an exemplary aspect extracts a set of features (e.g., exactly the same set of features) for the portfolio of service contracts for which tracking is desired. These features are extracted during the time window preceding the date of interest (e.g., generally the current date) for which the score needs to be computed.

Next, a forecasting model (e.g., 500) is applied to the extracted features, computing the score indicating the risk exposure of the account (e.g., an overall risk score 560 of contract termination), as well as the scores indicating the contribution of each of the aforementioned risk factors (e.g., $x_1, x_2, x_3, x_4$, and $x_5$, which are related to the risk factors, such as business performance 510, client satisfaction 520, pricing 530, corporate changes 540, and prior erosion 550).

According to an exemplary aspect of the present invention, the portfolio of services contracts can be sorted to answer questions such as which clients are the "riskiest" clients, which clients are under financial pressures, which customers are unhappy, and how much revenue is exposed to high risk, etc.

As illustrated, for example, in FIGS. 6A, 6B, 6C, and 6D, the data on the eroders and the comparative examples (e.g., risk components) can be used to show greater business volatility, increased financial distress, weaker expense controls, and lower business efficiency, among other things.

FIGS. 6A, 6B, 6C, and 6D illustrate some possible data that can be used to evaluate the erosion of accounts by comparing such accounts to other examples. Referring to FIG. 6 illustrates how the explanatory features differ in values between the client companies that terminated their contracts, and client companies that did not, for our example set. In general, client companies that terminated their contracts have much higher business volatility (as measured by volatility in key financial metrics, such as inventory turnover, revenue, and earnings per share), compared to both their respective industry averages, and the client companies that did not terminate their agreements. Client companies that terminated their agreements also had weaker expense control, higher financial distress, and lower business efficiencies, compared to both their respective industry averages and the client companies that did not terminate the agreement.

For example, factors which may be used to evaluate erosion or non-erosion include, among others, inventory turnover volatility, revenue volatility, earnings per share (EPS) volatility, change in credit rating, tend in cash flow, cash to revenue ratios/relationships, interest coverage, trend in interest coverage, trend in revenue, trend in cost of goods sold (COGS), trend in sales, general and administrative cost (SG&A), expenses and revenue, gross profit margin (GPM), net profit margin (NPM), receivables turnover (REC. TURN.), return on assets (ROA), Trend in ROA, return on equity (ROE), and trend in ROE, etc.

On the other hand, the present invention has determined that high gross profit margin (GPM) data in combination with other high risk factors can drive erosion. Thus, the present invention has identified that there are "high risk conditions" associated with high GPM accounts.

For example, as illustrated by FIGS. 7A, 7B, 7C, and 7D, other risk factors, such as financial pressures, client satisfaction, management changes, and/or business efficiency, among others, can drive erosion risk.

Figure 8:
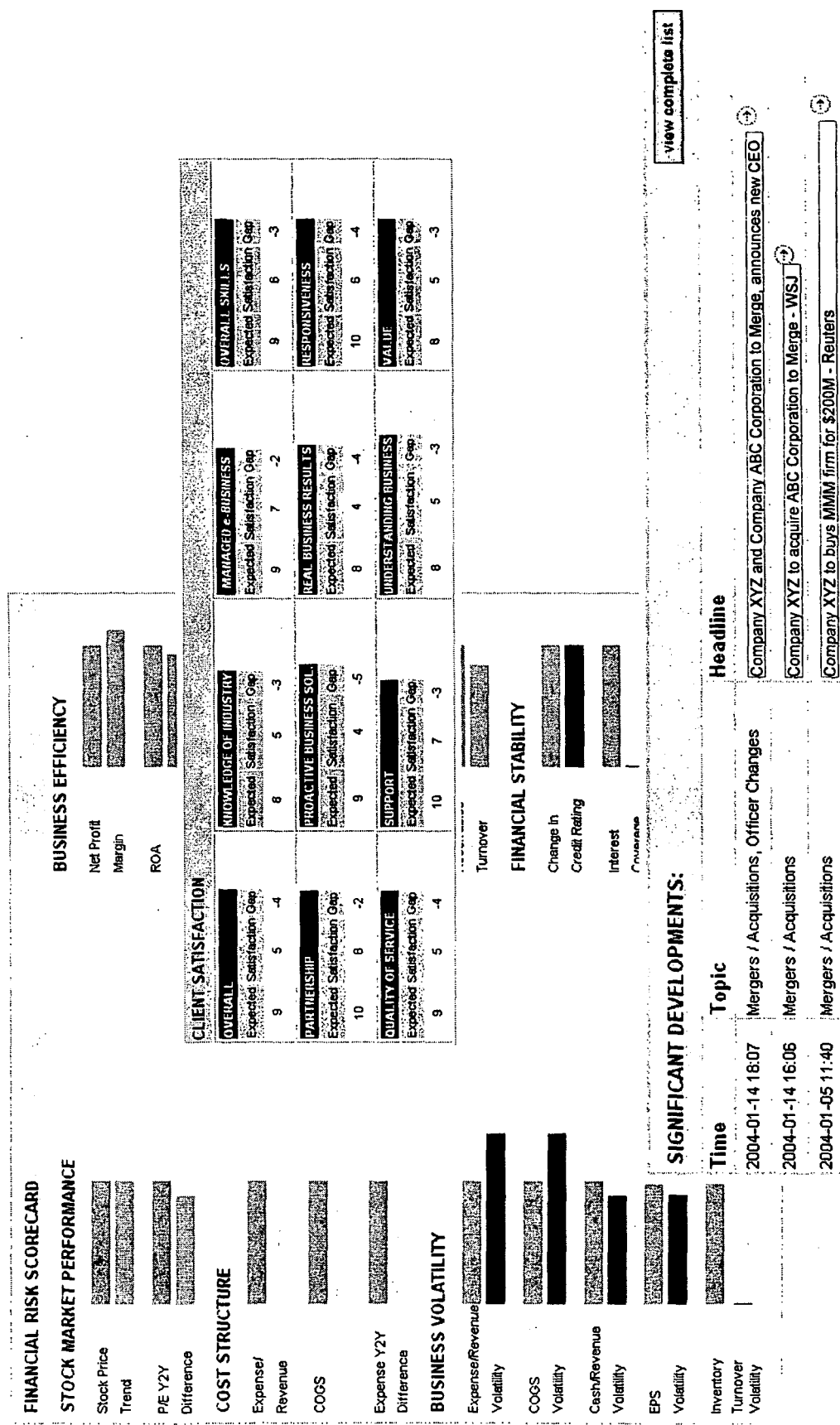
FIG. 8 illustrates an exemplary embodiment of a risk scorecard according to an exemplary embodiment of the present invention.

FIG. 8 illustrates an exemplary, detailed report showing risk factors, which can be used according to exemplary embodiments of the present invention.

Referring to FIGS. 5-8, an improved risk score is exemplarily provided. Contrary to the conventional risk assessment methods, individual erosion drivers are provided. For example, FIGS. 7A-7D exemplarily illustrate an erosion risk factor analysis output that demonstrates individualized erosion factors, including financial pressures in FIG. 7A, Client satisfaction in FIG. 7B, management changes in FIG. 7C, and business efficiency in FIG. 7D. Thus, all the various feature selection inputs illustrated in FIG. 5 are exemplarily accounted for.

FIG. 9 illustrates a table or portfolio of accounts that can be used to evaluate companies or accounts at risk of revenue change according to the exemplary embodiments of the present invention.

An exemplary aspect of the present invention determines which clients are at risk of erosion and why. That is, the exemplary method according to the present invention evaluates erosion drivers by, for example, understanding when and how these factors impact the services provider's accounts, quantifying the risk factors, developing mathematical models to measure different risk components, and forecasting overall erosion risk.

Another exemplary embodiment of the present invention develops a risk prediction tool, for example, by automating account tracking, supporting quarterly risk assessments which can drive relevant action plans, and leveraging detailed findings to identify new growth opportunities.

In the model according to an exemplary embodiment of the present invention, key questions are addressed. For example, an exemplary embodiment determines if the financial and business performance are linked to erosion, compares financial and business performance or eroding and non-eroding accounts, analyzes key financial metrics (e.g., over 200 variables), compares companies to their industry peers, and looks into a predetermined period of time (e.g., a 6-12 month period) prior to erosion.

An exemplary embodiment of the present invention evaluates whether the exemplary non-eroded clients are more favorable by analyzing several years of customer surveys, evaluating whether the grades are different and which questions from the survey really matter.

For example, as explained with reference to the exemplary embodiment illustrated in FIGS. 7A-7D, an exemplary embodiment can evaluate the pricing to determine whether high GPM (gross profit margin) data is a characteristic of erosion and how GPM data relates to other input variables, such as customer satisfaction, financial performance, business performance, and significant changes in client's company.

On the other hand, an exemplary embodiment of the invention evaluates and quantifies which changes are significant corporate changes. Examples of significant corporate changes may exemplarily include accounting issues, governmental inquiries (e.g., SEC inquiries), bankruptcy, debt financing, divestitures/spin-offs, equity financing, equity investments, expansion, new markets, new units, IPOs, litigation, regulatory proceedings, mergers and acquisitions, negative earnings pre-announcement, positive earnings pre-announcement, products, restructuring and reorganization, share purchases, and corporate-level management changes.

The publicly available information of the customer can be, for example, any one or a combination of significant client developments, client performance, financial metrics, business metrics, management changes, mergers, acquisitions, earnings pre-announcements, divestitures, share repurchases, expansions, new markets, layoffs, reorganizations, restructurings, initial public offerings, litigation, government probes, and regulatory probes.

The internal data of the customer can be, for example, any one of or a combination of level of client satisfaction, profitability, prior erosion, revenue information, profit information, customer surveys, types of services sold, length of a contract, value of a contract, and information on previous revenue change.

The present invention has discovered that certain kinds of significant corporate developments can signal erosion risk, as exemplarily illustrated in FIGS. 6A-6D and 7A-7D.

For example, the present invention has identified that eroded companies generally have higher activity in debt financing, divestitures and spin-offs, restructuring and reorganization, management changes (e.g., change in the Chief Operating Officer (CEO), the external CEO, or the President of the company/customer), mergers and acquisitions, share purchases, and equity investments. The exemplary aspects of the present invention can use such historical data to evaluate the present situation of a subject company or account.

On the other hand, the exemplary invention has identified that non-eroded companies had higher activity in expansion, new markets, and new units, positive earnings and pre-announcements, litigation, regulatory, and related announcements. The exemplary aspects of the present invention can use such historical data to evaluate the present situation of a subject company or account.

According to the exemplary aspects of the present invention, the providing companies may include, for example a) information technologies (IT) outsourcing providers, b) business process outsourcing providers, c) database, application software and tools vendors, d) strategy consultants, and e) market intelligence agencies, among others.

On the other hand, the user of the system and method according to the exemplary aspects of the present invention may be, for example:
  a) an employee in a service provider's company in charge of one (or several) accounts and relationships with the corresponding clients,
  b) a company executive in charge of the line of business interested in estimated future revenue streams from the entire portfolio (or a part of the portfolio),
  c) an executive in charge of the business strategy, interested in understanding what kinds of actions need to be taken towards certain accounts (or groups of accounts),
  d) a decision maker within the organization interested in marketing additional services to existing customers.

The exemplary methods and systems according to the present invention are not limited to forecasting the propensity of an account towards the revenue loss. The system and method according to the present invention also can be used, for example, to forecast an amount of revenue at stake, an amount of revenue gain, or an amount of revenue that may remain the same (e.g., stagnating revenues or flat revenues).

The system and method according to the present invention is quite general and is not limited to only two categories of examples (e.g., "positive" and "negative" examples). That is, the exemplary aspects of the invention easily can be modified to include several different categories of customers. For example, additional exemplary categories can include customers with substantial revenue change (e.g., revenue loss or gain), customers with moderate revenue change (e.g., revenue loss or gain), and customers with flat revenues (e.g., no revenue change).

As described above, the exemplary aspects of the present invention identify customers that are at risk of change (e.g., revenue loss or gain), and particularly, companies at risk of revenue erosion (e.g., companies at risk of revenue loss) such that a service provider can identifying these companies and use caution when dealing with these accounts.

The exemplary invention implements a set of different inputs or risk factors (e.g., client satisfaction, financial performance, information about the company, prior information about the prior revenue streams) to build a mathematical model (any mathematical predictive model or any algorithm) that will learn from historic examples of the past behavior of the subject account, or other accounts.

The present invention is not limited to any specific mathematical model or algorithm. That is, the data may describe anything that may effect the company or account, or the services provider's decision-making (i.e., there are an infinite number of possibilities of data that the exemplary invention can focus on).

The present invention is capable of identifying any number of potential risk or growth dimensions, gathering data that describes each of these dimensions, and then developing a model that adapts to (e.g., learns from) current or past behaviors (e.g., historical data, historical "positive" examples, and historical "negative" examples). That is, all of the past "positive" and "negative" risk/growth factors can be used to generate the models according to the exemplary invention.

According to the exemplary embodiments of the present invention, once the model is trained, the risk scores can be calculated based on the risk factors, and then, the risk scores can be combined in such a way as to compute an overall score (e.g., overall risk score or tracking index).

That is, the current or past data on the subject company, customer, or account can be used with the model to evaluate the company, customer, or account to determine if there is a risk of revenue change associated with the company, customer, or account.

In one exemplary embodiment, in which the model has already been trained, the user need only provide the company and date for which the risk of revenue change is desired.

On the other hand, in other exemplary embodiments, the data for the subject company, customer, or account can be used to determine the risk of revenue loss, or on the other hand, the company data and/or historical past data examples can be used to train the model based on what the company has done in the past.

Moreover, the exemplary embodiments of the invention are capable of focusing on predetermined time periods. That is, the exemplary aspects of the present invention can look at data over a previous time period and data during a current time period and use a comparison of the previous time period and the current time period to get an idea of what is happening in current time period (e.g., to predict a probability of revenue loss or gain, or to predict a probability that the subject company, customer, or account is similar to a known historical example).

The exemplary aspects of the present invention provide a system and method for identifying companies, customers, or accounts, etc, at risk of revenue change that is more accurate than the conventional systems and methods, while maintaining a minimum number of steps necessary. Therefore, the exemplary embodiments of the present invention are accurate and highly efficient.

A system for identifying an account at risk of revenue change according to another exemplary embodiment of the present invention includes a computing unit for computing a risk score for the account or customer based on a plurality of risk factors, as defined in the exemplary embodiments described above and in the exemplary Figures of the present invention, and a predicting unit for predicting a risk of revenue change of the account or customer based on such a risk score, as defined in the exemplary embodiments described above and in the exemplary Figures of the present invention.

Another exemplary system includes a predicting unit for predicting an amount of revenue at risk of revenue change based on the risk score, as defined in the exemplary embodiments described above and in the exemplary Figures of the present invention.

Yet another exemplary embodiment of the present invention includes a signal-bearing medium (e.g., 1100) tangibly embodying a program of machine-readable instructions executable by a digital processing apparatus to perform a method for identifying a customer at risk of revenue change, in which the method includes computing a risk score based on a plurality of risk factors, as described above.

Still another exemplary aspect of the present invention includes a method of deploying computing infrastructure in which computer-readable code is integrated into a computing system, and combines with the computing system to perform a method for identifying a customer at risk of revenue change, in which the method includes computing a risk score based on a plurality of risk factors.

FIG. 10 illustrates an exemplary hardware/information handling system 1000 for incorporating the present invention therein; and FIG. 11 illustrates a signal bearing medium 1100 (e.g., storage medium) for storing steps of a program of a method according to the present invention.

FIG. 10 illustrates a typical hardware configuration of an information handling/computer system for use with the invention and which preferably has at least one processor or central processing unit (CPU) 1011.

The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 1011, as represented by the fast-access storage for example. Alternatively, the instructions may be contained in another signal-bearing media, such as a magnetic data storage diskette 1100 (FIG. 11), directly or indirectly accessible by the CPU 1011.

Whether contained in the diskette 1100, the computer/CPU 1011, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method for identifying a customer at risk of revenue change and identifying individual erosion risk factors of a portfolio of contracts, said method being executed by a processor, the method comprising:
   constructing, as executed by the processor, a set of examples of client accounts;
   specifying a set of candidate risk drivers of the client accounts;
   computing, as executed by the processor, descriptive numeric features that capture erosion risk factors from each of the set of candidate risk drivers during a time window of interest;
   forming a mathematical model, as executed by the processor, to compute a risk score of contract termination and individual risk scores associated with each of said erosion risk factors;
   computing, as executed by the processor, a set of descriptive numeric features for the portfolio of contracts that is to be tracked based on the formed mathematical model;
   applying the formed mathematical model, as executed by the processor, to the set of descriptive numeric features;
   computing, as executed by the processor, a score indicating a risk exposure of an account in the portfolio of service contracts;
   computing, as executed by the processor, individual risk factor scores indicating a contribution of each of the risk factors to the computed score; and
   sorting the portfolio, as executed by the processor, to determine one of a client's risk, a client's financial pressures, a customer's unhappiness level, and how much of a client's revenue is exposed to high risk.

2. The method of claim 1, wherein the examples comprise negative client accounts including accounts that have been terminated, re-scoped, or a contract has been renegotiated with another company.

3. The method of claim 1, wherein the set of erosion risk factors comprise financial and business performance metrics, news-based metrics on significant changes in client's company, metrics that characterize client satisfaction with provider's quality of service and service delivery, metrics that characterize provider's price, and event-based metrics that characterize if a client had a history of contract termination.

4. The method of claim 1, wherein, in a case of a negative action, the time-window comprises a period preceding contract termination or a contract change.

5. The method of claim 1, wherein the mathematical model is formed from applying a statistical, machine learning operation to said set of examples to be optimized to produce a best forecast against these examples.

6. The method of claim 1, wherein the mathematical model is formed from applying an optimization approach to the set of examples to be optimized to produce a best forecast against these examples.

7. The method of claim 1, wherein the set of descriptive numeric features are extracted during the time window preceding the date of interest for which the risk score is to be computed.

8. The method of claim 1, further comprising sorting, as executed by the processor, the portfolio to determine at least one of a client's risk, a client's financial pressures, a customer's unhappiness level, and how much of a client's revenue is exposed to high risk.

9. The method of claim 1, further comprising identifying, as executed by the processor, combinations of descriptive numeric features that cause a significant change in the risk score indicating the risk exposure of the account in the portfolio of service contracts.

10. The method of claim 1, wherein each one of the individual risk factor scores is multiplied by a determined weight factor.

11. The method of claim 1, wherein the examples comprise positive client accounts.

12. A method for iteratively identifying a customer at risk of revenue change based on and identifying individual erosion risk factors of a portfolio of service contracts, said method being executed by a processor, the method comprising:

observing a series of training samples, as executed by the processor, each of the training samples having a plurality of training sample features;

identifying a series of variables, as executed by the processor, from the series of training samples;

iteratively splitting the series of samples, as executed by the processor, according to each of the variables;

determining an impact of each of the variables, as executed by the processor;

identifying combinations of variables, as executed by the processor, that result in a significant change in parameter values; and sorting the portfolio, as executed by the processor, to determine one of a client's risk, a client's financial pressures, a customer's unhappiness level, and how much of a client's revenue is exposed to high risk.

* * * * *